Patented July 28, 1953

2,647,094

UNITED STATES PATENT OFFICE 2,647,094

PIGMENT PASTES COMPRISING A PIGMENT AND A SALT OF A COPOLYMER OF STYRENE AND A MALEIC HALF-ESTER

Frank J. Hahn, Springfield, Mass., assignor to Monsanto Chemical Company, St. Louis, Mo., a corporation of Delaware No Drawing. Application August 19, 1950, Serial No. 180,511

16 Claims. (Cl. 260—23)

This invention relates to aqueous pigment pastes. More particularly, the invention relates to aqueous pigment pastes having dispersant properties.

One of the more recent developments in the surface coating field is the use of an aqueous vehicle instead of an organic solvent vehicle for carrying the surface coating resins, pigments, etc. The use of water instead of organic solvents reduces the cost of the coating material and eliminates the hazards due to the inflammability of most of the organic solvents. It also eliminates the characteristic odors of the organic solvents which are objectionable to many people.

The use of aqueous media has been hampered by the necessity of using protective colloids or dispersing agents in sufficient quantity to maintain the pigments, resins, etc. in suspension during storage and shipment. Since the function of these additives is to lessen the hydrophobic properties of the resins, pigments, etc. to such an extent that they remain suspended in water, the additives must be at least partially soluble in water. Such solubility renders the finished coatings sensitive to water and markedly impairs the efficiency of the coatings. Furthermore, with most of the protective colloids and dispersing agents, vigorous and extended agitation is necessary in order to produce a relatively stable emulsion or dispersion. In fact, the agitation necessary is so vigorous that it cannot be satisfactorily accomplished without expensive and often unwieldy apparatus.

One object of this invention is to provide new pigment pastes.

A further object is to provide aqueous pigment pastes which have dispersant properties.

Another object is to provide aqueous pigment paste dispersants.

Still another object is to provide aqueous pigment pastes which may be used to disperse film-forming surface coating materials in aqueous media under conditions of mild agitation.

These and other objects are attained by mixing a pulverulent water-insoluble styrene-maleic ester copolymer into an aqueous slurry containing a water-insoluble pigment and then adding ammonia or a volatile amine to the slurry.

The following examples are given as illustrations and are not intended as limitations on the scope of this invention. Where parts are mentioned they are parts by weight.

*Example I*

A paste is prepared by first mixing together in the dry state 350 parts of lithopone, 25 parts of bentonite, 150 parts of mica and 20 parts of a pulverulent copolymer of styrene and a half-ester of maleic acid, said half ester containing as ester radicals, 25 mol percent methyl groups and 75 mol percent secondary butyl groups, and then adding to this dry mix 400 parts of water and 6 parts of ammonium hydroxide (28% ammonia) with constant mild agitation. The resulting product is an aqueous paste consisting of pigment particles dispersed in a solution of the ammonium salt of the copolymer.

The paste thus prepared may be used as the sole dispersing agent for preparing aqueous emulsions or dispersions of film-forming surface coating materials such as liquid resins, drying oils, varnishes, solutions of solid resins in aqueous or organic solvents, etc., to produce water paints and oil-in-water type emulsion paints. The dispersions or emulsions are prepared by gentle stirring together of the various ingredients for relatively short periods of time. Thus, 110 parts of a varnish containing, as the film-forming ingredient, a drying oil-modified alkyd resin of medium oil content, may be mixed with the paste produced in this example under constant but mild agitation. After about one hour of mixing an oil-in-water type emulsion is produced which is suitable for direct use as a paint. Coatings prepared therefrom have a flat finish and, after the normal drying period, are substantially impervious to water.

In a similar manner, linseed oil, tung oil or other drying oils may be easily and quickly emulsified with the paste of Example I to give water paints which dry to water-insensitive flat coatings.

Attempts to prepare clear varnishes and coatings by emulsifying the varnishes or oils in water using an aqueous solution of the ammonium salt of the copolymer of Example I as a dispersing agent, met with failure unless prolonged periods of extremely vigorous high speed agitation were used. If the pigments were ground into the varnish or oil in the conventional manner prior to the emulsification of the film-forming material, it was even more difficult to form an emulsion using the ammonium salt of the copolymer as a dispersing agent.

*Example II*

A pigment paste is prepared by mixing together 250 parts of titanium dioxide, 260 parts of water and 20 parts of a copolymer of styrene and a mixed methyl-secondary butyl half-ester of maleic acid until the copolymer and the pigment are thoroughly intermingled. Ten parts of morpholine are then stirred into the paste resulting in the dissolving of the copolymer in the water. Thirty parts of water and 120 parts of a plasticizer, butyl benzyl phthalate, are stirred into the paste until an oil-in-water emulsion is obtained. This emulsion is then blended with 320 parts of a 50% solids aqueous emulsion of polystyrene and 10 parts of pine oil, the latter being an anti-foaming agent. Constant but gentle stirring is maintained throughout the additions to the pigment paste. The product is an oil-in-water type emulsion paint. It may be applied to porous or nonporous surfaces by spraying, dipping, brushing, roll-coating and other conventional methods and dries to yield a water-insensitive coating having a semi-gloss finish. This emulsion paint has the further advantage that it is unaffected by repeated freezing and thawing of the paint.

Example III

A pigment paste is prepared by mixing together 250 parts of titanium dioxide, 260 parts of water and 30 parts of a copolymer of styrene and a mixed methyl-secondary butyl half-ester of maleic acid until the copolymer and the pigment are thoroughly intermingled. Eleven parts of ammonium hydroxide (28% ammonia) are then stirred into the paste resulting in the dissolving of the copolymer in the water. Ten parts of pine oil and 90 parts of plasticizer HB-40 (a partially hydrogenated terphenyl) are stirred into the paste until an oil-in-water emulsion is obtained. To this emulsion are added 120 parts of a 4% aqueous emulsion of methyl cellulose having a viscosity of about 100 centipoises. Finally, 60 parts of water and 160 parts of a 50% solids aqueous emulsion of polystyrene are added with constant gentle stirring. The product is an oil-in-water type emulsion paint, having exceptionally good freeze-thaw stability, which may be used to obtain a water-insensitive coating having a semi-gloss finish.

Example IV

A pigment paste is prepared by mixing together 250 parts of titanium dioxide, 260 parts of water and 30 parts of a copolymer of styrene and a mixed methyl-secondary butyl half-ester of maleic acid, until the copolymer and the pigment are thoroughly intermingled. To this paste are added 11 parts of ammonium hydroxide (28% ammonia) resulting in the dissolving of the copolymer in the water. Then 10 parts of pine oil, 60 parts of water and 380 parts of a 45% solids aqueous emulsion of butadiene-styrene copolymer are stirred into the paste with constant mild stirring until an oil-in-water emulsion is obtained. The ratio of butadiene to styrene in the copolymer is 45:55 on a weight basis. The resulting emulsion can be applied to porous and non-porous surfaces by conventional methods and dries to yield a tough, water-insensitive coating having a semi-gloss finish. The emulsion paint is exceptionally stable to repeated freezing and thawing conditions. Furthermore, the coatings prepared from this emulsion paint are unexpectedly resistant to alkali. For example, a 50% solution of sodium hydroxide in water will only swell the dried coating to a slight extent.

Example V

A paste is prepared by mixing together 100 parts of a toluidine toner, 200 parts of water and 30 parts of a copolymer of styrene and a mixed methyl-secondary butyl half-ester of maleic acid. After a short stirring period (about 4 to 5 minutes), 9 parts of ammonium hydroxide (28% ammonia) are stirred into the mixture to solubilize the copolymer. To the paste thus made are added, successively, 100 parts of dioctyl phthalate and 400 parts of a 50% solids solution of a soluble, fusible butylated methylol melamine in a xylol-butanol mixture. Constant gentle stirring is maintained until phase inversion occurs (from 40 to 60 minutes) to produce a water-in-oil type emulsion. This emulsion is suitable for use as a printing ink and is especially adapted for printing on porous surfaces such as unglazed paper. The ink may be cured to an insoluble infusible state by short heating at temperatures ranging from 100–200° C.

Example VI

A paste is prepared by mixing together 100 parts of a phthalocyanine blue pigment, 300 parts of water and 20 parts of a copolymer of styrene and a mixed methyl-secondary butyl half-ester of maleic acid. To the thick slurry thus produced is added 5 parts of ammonium hydroxide (28% ammonia) to solubilize the copolymer. One part of manganese naphthenate is stirred into the paste, followed by the addition of 300 parts of linseed oil. After gentle agitation for about 30 minutes, the pigment, copolymer and drier become transferred to the oil phase. After a further short period without agitation, the oil and water phases separate and the pigmented oil may be recovered by decantation. The product is a viscous oil-based coating composition which may be blended with more oil or with conventional solvents and thinners such as turpentine, benzene, xylene, mineral spirits etc. to yield a linseed oil enamel. When coated on a smooth surface, the enamel dries to a tough, water-impervious film. The process of this example has the particular advantage that it provides a pigmented oil enamel without the usual extensive grinding of the pigments in the oil medium.

Example VII

A paste is prepared by mixing 200 parts of ultramarine blue with 250 parts of water and 20 parts of a copolymer of styrene and a mixed methyl-secondary butyl half-ester of maleic acid. After a few minutes of gentle agitation, 9 parts of triethylamine are stirred into the mixture to produce a soft pigment paste. The paste may be used as the emulsifying agent in producing emulsion paints by merely stirring the paste together with a coating resin or by mixing the paste with an already-formed unpigmented emulsion of a coating resin.

An alternative method for making the paste dispersants of this invention is to add the copolymer to the pigments during the process for the preparation of the pigment. For example, in many pigment manufacturing processes, a suspension of finely divided pigment in an aqueous medium is obtained. Ordinary pigment practice involves the removal of water from the suspension and grinding the dry pigment prior to using the pigment as a coloring agent. The pigment pastes of this invention may be prepared by adding the copolymers to the aqueous suspension and solubilizing them, thus eliminating the drying and grinding steps, to give extremely finely divided pigments of better color than the prior art products.

Example VIII

An aqueous slurry of titanium dioxide, prepared in the usual manner by calcination of raw pigment followed by grinding in water, is modified by the addition of 20 parts per 100 parts of titanium dioxide, of a copolymer of styrene and a mixed methyl-secondary butyl half-ester of maleic acid. A homogeneous mixture is quickly attained by gentle agitation, whereupon 6 parts of ammonium hydroxide (28% ammonia) are added. The resulting slurry is stirred for about 30 minutes to provide a pigment paste having dispersant properties.

The copolymers to be used in preparing the pigment paste dispersants are prepared by esterifying maleic acid with sufficient of a mixture of methanol and secondary butanol to produce a half-ester, followed by copolymerization of the half-ester with styrene. More specifically, one mol of maleic acid is heated with about 0.5 mol of a mixture of methanol and secondary butanol. In said mixture, the methanol preferably constitutes about 25 mol percent and the secondary butanol 75 mol percent but other ratios varying from 11 to 48 mol percent of methanol and 89 to 52 mol percent of secondary butanol may be used. The esterification proceeds smoothly without the aid of a catalyst. The half-ester thus produced is copolymerized with styrene at 80 to 100° C. in the presence of a peroxy catalyst. The mol ratio of styrene to maleic acid half-ester is substantially 1:1. A slight excess of styrene may be used which does not enter into the reaction and eventually volatilizes from the product.

The copolymers are hard, clear solids which are insoluble in water. Being quite brittle, the copolymers may be easily pulverized to a fine particle size. For the purposes of this invention the pulverulent form is especially desirable since it is important to intermingle the pigment and copolymer as thoroughly as possible prior to solubilization of the copolymer. The copolymers may be used in amounts ranging from 1 to 50 parts per 100 parts of pigment.

The copolymers are solubilized after preliminary slurrying with pigment in water, by adding to the slurry, per mol of copolymer, at least one mol of ammonia or an amine which is volatile at temperatures below 100° C. An excess of ammonia or amine may be used but the amount in excess does not affect the solubility of the copolymer and is subsequently vaporized. Among the amines which may be used are morpholine and the volatile primary, secondary and tertiary alkyl amines in which the alkyl groups contain 1 to 3 carbon atoms including methyl, ethyl, propyl, isopropyl, dimethyl, diethyl, triethyl and trimethyl amines. Mixtures of the volatile salt forming compounds may be used.

The copolymers, even in their soluble form, are not especially efficient emulsifying or dispersing agents. As shown in Example I, it is difficult to prepare an aqueous emulsion of an alkyd varnish, using only the soluble form of a copolymer without first preparing a pigment paste. However, the pigment pastes prepared according to this invention are efficient emulsifying and dispersing agents as evidenced by the fact that the only agitation necessary to produce emulsions is a gentle stirring such as is produced by a pony mixer or a Baker-Perkins dough mixer. This eliminates the need for employing colloid mills, etc. which produce extremely vigorous agitation but which are expensive to install and maintain.

A further advantage of the pigment pastes of this invention is that, after having fulfilled their role of dispersing agent, they revert to a water insoluble state on drying of the coating compositions. Films thus obtained are impervious to water. In contrast, soaps and most synthetic detergents used as dispersants retain their water solubility in the dried coatings so that the coatings are water-sensitive and may not be used where high humidity prevails.

An unexpected advantage of these pastes is the alkali resistance of most coatings derived from water paints made with the pastes. After a coating has been formed and dried sufficiently to drive off the volatile salt-forming ingredient of the paste, the styrene-maleic half-ester copolymers are no longer soluble in dilute alkali and only swell to a minor extent in concentrated alkali.

Still another advantage of the paste dispersants pertains particularly to water paints prepared from the dispersants and aqueous emulsions of polymers and copolymers of vinyl compounds such as the polystyrene and the butadiene-styrene copolymer emulsions of the examples. These emulsion paints, if prepared with the pigment paste dispersants of this invention, are exceedingly stable to repeated freezing and thawing. The freeze-thaw stability is particularly valuable in the storage and transportation of the emulsion paints in winter weather.

The pigment pastes may be prepared from inorganic and organic water-insoluble pigments including organic dyes which have been insolubilized in lake form. By using the process and copolymers of this invention, a smooth paste is easily formed and a minimum of agglomeration of the pigment particles occurs. Furthermore the generally used process of grinding the pigments in the coating vehicle for extensive periods of time is eliminated.

As shown in the examples, the pigment pastes of this invention may be used to disperse a wide variety of organic film-forming materials in aqueous media to yield water paints which, on drying, are insensitive to water. The only restrictions as to the film-forming ingredient to be made into a water paint with the pigment paste dispersants of this invention are that they shall either be liquid at normal temperatures, e. g., drying oils, or in a fluid form either by being dissolved in organic solvents such as the alkyd resin of Example I, the melamine resin of Example V, or emulsified or dispersed in aqueous media such as the polystyrene and butadiene-styrene copolymer of Examples II, III and IV. Among the film-forming ingredients which may be used are drying and semi-drying oils and mixtures thereof; natural resins such as shellac, rosin, and rosin derivatives; saturated and unsaturated polyester resins; phenol aldehyde resins; melamine aldehyde resins; melamine aldehyde-alcohol resins; urea aldehyde resins; urea aldehyde-alcohol resins; polymers and copolymers of vinylidene compounds including polymers and copolymers of vinyl esters such as vinyl acetate, vinyl chloride, etc.; vinyl ethers; vinyl aromatic compounds such as styrene, alpha-methyl styrene, ring-substituted styrenes; olefins and diolefins such as ethylene, butadiene, isoprene, etc.; and suitable compatible mixtures of any of the above. For some of these resins it is necessary to add a plasticizer such as the partially hydrogenated terphenyl and the butyl benzyl phthalate of the examples. Other conventional ingredients of coating compositions may be added to the emulsion paints either prior to or at the same time as the incorporation of the film-forming ingredients. Among such additives are driers such as metal naphthenates; antifoaming agents such as pine oil; viscosity improving agents, such as methyl cellulose, etc.

It is obvious that many variations may be made in the products and processes of this invention without departing from the spirit and scope thereof as defined in the appended claims.

What is claimed is:

1. A pigment paste comprising water, 100 parts of a pulverulent water-insoluble pigment and from 1 to 50 parts of a salt prepared by neutralizing a copolymer of styrene and a half-ester of maleic acid with a compound taken from the group consisting of ammonia, morpholine and alkyl amines which are volatile at temperatures below 100° C., the ester groups in said half-ester consisting of a mixture of methyl groups and secondary butyl groups, the ratio of methyl groups to secondary butyl groups varying from 11:89 to 48:52 mol percent.

2. A pigment paste as in claim 1 wherein the mol ratio of styrene to half-ester of maleic acid is 1:1.

3. A pigment paste as in claim 1 wherein the ratio of methyl groups to secondary butyl groups is 25:75 mol percent.

4. A pigment paste as in claim 1 wherein the salt is a salt of ammonia and a copolymer of styrene with a half-ester of maleic acid.

5. A pigment paste as in claim 1 wherein the salt is a salt of morpholine and a copolymer of styrene with a half-ester of maleic acid.

6. A pigment paste as in claim 1 wherein the salt is a salt of an alkyl amine that is volatile at temperatures below 100° C., and a copolymer of styrene with a half-ester of maleic acid.

7. A pigment paste as in claim 6 wherein the alkyl amine is triethyl amine.

8. A method for preparing a pigment paste having dispersant properties which comprises adding a pulverulent water-insoluble copolymer of styrene and a half-ester of maleic acid to an aqueous slurry of a water-insoluble pigment, thoroughly intermingling the copolymer with the pigment and then solubilizing the copolymer by adding a compound taken from the group consisting of ammonia, morpholine and alkyl amines which are volatile at temperatures below 100° C., the ester groups in said half-ester consisting of a mixture of methyl and secondary butyl groups, the ratio of methyl groups to secondary butyl groups varying between 11:89 and 48:52 mol percent.

9. A process as in claim 8 wherein the mol ratio of styrene to half-ester of maleic acid is 1:1.

10. A process as in claim 8 wherein the ratio of methyl groups to secondary butyl groups is 25:75 mol per cent.

11. A process as in claim 8 wherein the solubilizing compound is ammonia.

12. A process as in claim 8 wherein the solubilizing compound is morpholine.

13. A process as in claim 8 wherein the solubilizing compound is triethyl amine.

14. A process for preparing a pigmented oil coating composition which comprises adding a pulverulent water-insoluble copolymer of styrene and a half-ester of maleic acid in which the ester groups consist of methyl and secondary butyl groups, the ratio of methyl groups to secondary butyl groups varying from 11:89 to 48:52 mol percent, to an aqueous slurry of a water-insoluble pigment, thoroughly intermingling the copolymer with the pigment, solubilizing the copolymer by adding a salt-forming compound taken from the group consisting of ammonia, morpholine and aliphatic amines which are volatile at temperatures below 100° C., adding a drying oil with constant mild agitation until the pigment and copolymer are transferred to the oil phase, thereafter stopping the agitation to permit the oil phase to separate from the aqueous phase and finally obtaining the pigmented oil phase substantially free of water by decantation.

15. A pigmented oil coating composition comprising a drying oil, a water-insoluble pigment and a copolymer of styrene and a mixed half-ester of maleic acid in which the ester groups consist of methyl and secondary butyl groups, the ratio of methyl to secondary butyl groups varying from 11:89 to 48:52 mol percent, said half-ester having been neutralized with a compound taken from the group consisting of ammonia, morpholine and aliphatic amines which are volatile at temperatures below 100° C.

16. A pigmented coating composition comprising an aqueous dispersion of a copolymer of butadiene and styrene in which the styrene constitutes at least 50% by weight of the copolymer, a water-insoluble pigment and a copolymer of styrene and a mixed half-ester of maleic acid in which the ester groups consist of methyl and secondary butyl groups, the ratio of methyl to secondary butyl groups varying from 11:89 to 48:52 mol percent, said half-ester having been neutralized with a compound taken from the group consisting of ammonia, morpholine and aliphatic amines which are volatile at temperatures below 100° C.

FRANK J. HAHN.

References Cited in the file of this patent

UNITED STATES PATENTS

| Number | Name | Date |
| --- | --- | --- |
| 1,976,679 | Fikentscher | Oct. 9, 1934 |
| 2,454,284 | Kirk | Nov. 23, 1948 |
| 2,533,635 | Seymour | Dec. 12, 1950 |
| 2,537,016 | Barrett | Jan. 9, 1951 |